United States Patent

Maier

[15] 3,687,985
[45] Aug. 29, 1972

[54] RED ANTHRAQUINONE DYES CONTAINING ESTER GROUPS

[72] Inventor: Karl Maier, Ludwigshafen, Germany

[73] Assignee: Badische Anilin- & Soda Fabrik Aktiengesellschaft Land Rhineland-Pfalz, Germany

[22] Filed: Sept. 5, 1969

[21] Appl. No.: 855,779

[30] Foreign Application Priority Data

Sept. 22, 1968  Germany..........P 17 94 115.0

[52] U.S. Cl. ..............................260/376, 8/39, 8/40
[51] Int. Cl. ................................................C09b 1/54
[58] Field of Search.............................260/376, 380

[56] References Cited

UNITED STATES PATENTS 3,445,485  5/1969  Straley......................260/380
3,530,150  9/1970  Rickenbacher............260/380

OTHER PUBLICATIONS

Akamatsu et al., as cited in Chem. Abstracts, 60, 14646.

*Primary Examiner*—Lorraine A. Weinberger
*Assistant Examiner*—E. Jane Skelly
*Attorney*—Johnston, Root, O'Keeffe, Keil, Thompson & Shurtleff

[57] ABSTRACT

Red 1-amino-4-hydroxyanthraquinone dyes which contain in the 2-position, attached by way of an oxygen atom, a hydrocarbon radical which in turn bears an esterified hydroxyl group. The dyes are particularly suitable for dyeing polyester textile material.

3 Claims, No Drawings

RED ANTHRAQUINONE DYES CONTAINING ESTER GROUPS

This invention relates to new, valuable red anthraquinone dyes containing ester groups, their production and the use of these dyes for dyeing and printing semisynthetic and synthetic textile material.

The dyes according to the invention have the formula:

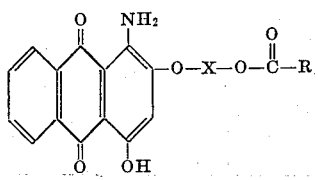
(I)

in which X denotes an aliphatic or cycloaliphatic hydrocarbon radical having from two to nine carbon atoms which may also contain the bridging member —O— and R denotes a hydrogen atom, an aliphatic hydrocarbon radical having one to five carbon atoms which may bear halogen atoms, cyano groups, keto groups, carboxylic ester groups or phenyl groups as substituents, or a phenyl radical which may bear halogen atoms, hydroxyl groups, methyl groups, methoxy groups, nitro groups, amino groups or carboxylic ester groups as substituents. Linear or branched saturated radicals are suitable as aliphatic radicals X having two to nine carbon atoms which may contain the bridging member —O—. The following radicals are given by way of example:

$-(CH_2)_n-$, $-(CH_2)_m-CH-CH_3$, $-CH_2-CH_2-O-CH_2-CH_2-$ and

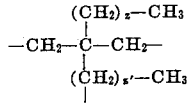

in which $n$ denotes one of the integers 2 to 9, $m$ denotes 1, 2 or 3, $z$ denotes zero or 1 and $z'$ denotes zero, 1, 2 or 3. An example of a cycloaliphatic radical of the specified type is the radical

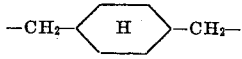

Linear or branched, saturated and unsaturated radical having one to five carbon atoms, which may contain the said substituents, are suitable as the aliphatic hydrocarbon radicals R.

The following are given as examples of the radical R:

$-H$, $-CH_3$, $-C_2H_5$, $-CH=CH_2$, $-CH_2-CH=CH_2$, $-CH_2-Cl$,
$-CH-Cl$, $-CH_2-Br$, $-CH_2-CN$, $-CH_2-CH_2-Cl$,
$-CH(Cl)-CH_2-Cl$, $-CH_2-CO-CH_3$, $-CH=CH-CH_3$,

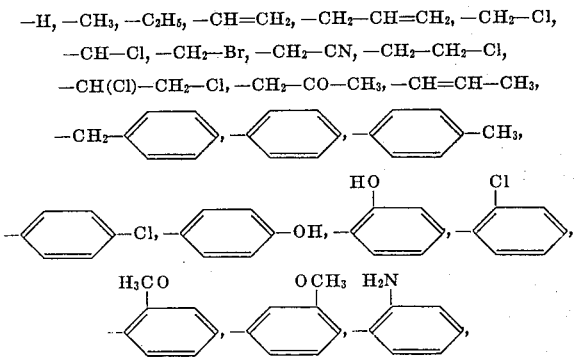

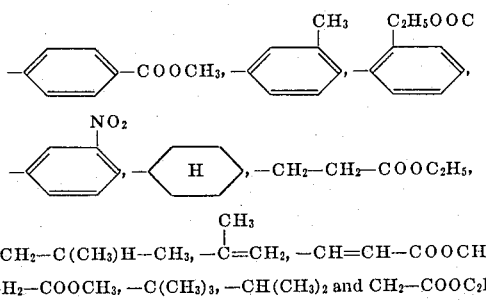

$-CH_2-C(CH_3)H-CH_3$, $-C=CH_2$, $-CH=CH-COOCH_3$,
$-CH_2-COOCH_3$, $-C(CH_3)_3$, $-CH(CH_3)_2$ and $CH_2-COOC_2H_5$.

The new dyes may be prepared for example by esterifying an anthraquinone derivative having the formula:

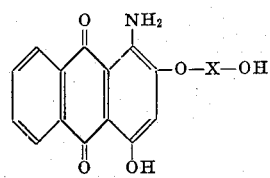
(II)

with an acid having the formula R—COOH or a functional derivative of such an acid by a conventional method. For example the procedure may consist in treating the anthraquinone derivative having the formula (II) with the appropriate acid anhydride in the presence of a base such as pyridine at temperatures up to 40° C or with the free acid at temperatures above 70° C, advantageously at the boiling temperature of the acid, and in the presence or absence of an esterification catalyst such as sodium acetate or p-toluenesulfonic acid. The said acids or acid derivatives are used in at least the stoichiometric amount with reference to the weight of the compound (II), but advantageously with an excess of for example twice to three times.

Dyes having the formula (I) which contain a carboxylic ester group in the radical R are advantageously prepared by reaction of the starting material having the formula (II) with the appropriate dicarboxylic ester. Only one of the two ester groups reacts, the new dye being formed.

Examples of acids having the formula R—COOH are: formic acid, acetic acid, propionic acid, chloroacetic acid, bromoacetic acid, dichloroacetic acid, chloropropionic acid, cyanoacetic acid, acrylic acid, phenylacetic acid, acetoacetic acid, butyric acid, isobutyric acid, valeric acid, isovaleric acid, malonic acid, fumaric acid, pivalic acid, methoxyacetic acid, benzoic acid, salicylic acid, succinic acid, hexahydrobenzoic acid, phthalic acid and terephthalic acid.

Some of the anthraquinone derivatives having the formula (II) which are used as starting materials for the production of the new dyes are known from U.K. Pat. Specification No. 982,267. Since these starting materials are themselves dyes having good fastness properties it is surprising that the dyes obtained from these known dyes by esterification have a much better affinity for polyester fibers, so that the dye yield is increased. It is also surprising that the excellent fastness properties of the starting dyes having the formula (II) are not impaired by esterification to form the dyes according to this invention and that fastness to heat setting is even improved.

The dyes according to this invention are valuable dyes which in the dyeing of semisynthetic and synthetic textile material such as textile material of cellulose acetate, triacetate, polyamide, but particularly polyester fibrous material, are distinguished by excellent fastness properties and by outstanding affinity. It is also possible to use mixtures of the dyes for dyeing or printing.

The invention is illustrated by the following Examples, in which parts and percentages are by weight.

EXAMPLE 1

25 parts of 1-amino-4-hydroxy-2-(ω-hydroxyhexoxy)-anthraquinone is boiled with 70 parts of glacial acetic acid and 1 part of anhydrous sodium acetate for eight hours under reflux. The mixture is diluted with 70 parts of methanol and cooled, followed by suction filtration. 27 parts of the red dye 1-amino-4-hydroxy-2-(ω-acetoxyhexoxy)-anthraquinone is obtained having a melting point of 130° to 131.5° C (from butanol).

EXAMPLE 2

20 parts of 1-amino-4-hydroxy-2-(ω-hydroxyhexoxy)-anthraquinone is heated for 6 hours at 90° C with 100 parts of butyl formate and 6 parts of p-toluenesulfonic acid. The whole is cooled, suction filtered and washed with methanol. 19 parts of the red dye 1-amino-4-hydroxy-2-(ω-formoyloxyhexoxy)-anthraquinone is obtained having a melting point of 150° to 151° C (from butanol).

EXAMPLE 3

20 parts of 1-amino-4-hydroxy-2-(ω-hydroxyhexoxy)-anthraquinone is heated for 6 hours at 120° C with 50 parts of propionic acid and 0.2 part of toluene-sulfonic acid and diluted with 50 parts of methanol. The reaction mixture is cooled, suction filtered and washed with methanol and water. 21.9 parts of the dye 1-amino-4-hydroxy-2-(ω-propionyloxyhexoxy)-anthraquinone having a melting point of 129° to 130° C is obtained.

By following the procedure described in the foregoing Examples but using anthraquinone derivatives having the formula (II) and having the radicals X indicated in the following Table and the specified acids or acid derivatives, red dyes containing ester groups and having the radicals R indicated in the Table are obtained.

The following abbreviations are used in the Table:
Ex = number of the Example
Acid = acid or acid derivatives
M. Pt. = melting point in °C after recrystallization from the solvent indicated in parenthesis
CB = chlorobenzene
B = butanol
P = propanol
EA = ethyl acetate
E = ethanol
E/Be = mixture of ethanol and benzene 2 : 1.

| Ex | X | Acid | R | M. Pt. |
|---|---|---|---|---|
| 4 | -(CH$_2$)$_2$- | acetic acid | -CH$_3$ | 227–228 (CB) |
| 5 | -(CH$_2$)$_2$- | dichloroacetic acid | -CHCl$_2$ | 201–202 (B) |
| 6 | -(CH$_2$)$_3$- | acetic acid | -CH$_3$ | 179–180 |
| 7 | -(CH$_2$)$_3$- | dichloroacetic acid | -CHCl$_2$ | 152–153 (B) |
| 8 | -(CH$_2$)$_4$- | ethyl acetate | -CH$_3$ | 187–188 (B) |
| 9 | —(CH$_2$)$_2$—CH—CH$_3$ | acetic acid | -CH$_3$ | 144–145 (B) |
| 10 | —(CH$_2$)$_2$—CH—CH$_3$ | dichloroacetic acid | -CHCl$_2$ | 172–173 (B) |
| 11 | —(CH$_2$)$_3$—CH—CH$_3$ | acetic acid | -CH$_3$ | 139–141 (P) |
| 12 | -(CH$_2$)$_5$- | acetic acid | -CH$_3$ | 151–152 (B) |
| 13 | -(CH$_2$)$_6$- | acetic anhydride | -CH$_3$ | 130–131 (B) |
| 14 | -(CH$_2$)$_6$- | ethyl propionate | -CH$_2$CH$_3$ | 124–125 (B) |
| 15 | -(CH$_2$)$_6$- | monochloroacetic acid | -CH$_2$Cl | 146–147 (B) |
| 16 | -(CH$_2$)$_6$- | dichloroacetic acid | -CHCl$_2$ | 160–161 (B) |
| 17 | -(CH$_2$)$_6$- | ethyl monobromoacetate | -CH$_2$Br | 144–145 (EA) |
| 18 | -(CH$_2$)$_6$- | ethyl cyanoacetate | -CH$_2$-CN | 170.5–171 (B) |
| 19 | -(CH$_2$)$_6$- | β-chloropropionic acid | -CH$_2$-CH$_2$Cl | 131–132 (B) |
| 20 | -(CH$_2$)$_6$- | α,α-dichloropropionic acid | -C(Cl)$_2$-CH$_3$ | 139–140 (B) |
| 21 | -(CH$_2$)$_6$- | phenylacetic acid | -CH$_2$-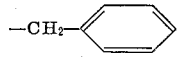 | 122–123 (B) |
| 22 | -(CH$_2$)$_6$- | crotonic acid | -CH = CH-CH$_3$ | 92–93 (E) |
| 23 | -(CH$_2$)$_2$O(CH$_2$)$_2$- | acetic acid | -CH$_3$ | 139–140 |
| 24 | -CH$_2$-C(CH$_3$)$_2$-CH$_2$- | acetic acid | -CH$_3$ | 166–167 (B) |
| 25 | -CH$_2$-C(C$_2$H$_5$)$_2$-CH$_2$- | acetic acid | -CH$_3$ | 123–124 (B) |
| 26 | —CH$_2$—C(C$_2$H$_5$)(C$_4$H$_9$)—CH$_2$— | acetic acid | -CH$_3$ | 115–116 (E) |
| 27 | -CH$_2$-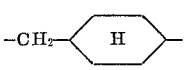-CH$_2$- | acetic acid | -CH$_3$ | 195–197 (B) |
| 28 | -(CH$_2$)$_6$- | ethyl acetoacetate | -CH$_2$-CO-CH$_3$ | 128–129 (E) |
| 29 | -(CH$_2$)$_6$- | benzoic acid |  | 157–158 (B) |
| 30 | -(CH$_2$)$_6$- | methyl p-hydroxybenzoate |  | 185–186 (E) |

| | | | | |
|---|---|---|---|---|
| 31 -(CH₂)₆- | methyl salicylate | HO-C₆H₄- | 142–143 (B) | |
| 32 -(CH₂)₆- | diethyl succinate | -CH₂CH₂COOC₂H₅ | 109–110 (E) | |
| 33 -(CH₂)₆- | iso-valeric acid | -CH₂C(CH₃)H-CH₃ | 127–128 (B) | |
| 34 -(CH₂)₆- | o-chloro-benzoic acid | -C₆H₄-Cl | 138–139 (E/Be) | |
| 35 -(CH₂)₆- | butyric acid | -C₃H₇ | 118.5–119 (P) | |
| 36 -(CH₂)₆- | phenyl-acetic acid | -CH₂-C₆H₅ | 122–123 (B) | |
| 37 -(CH₂)₆- | methyl methacrylate | CH₃-C(|)=CH₂ | 139–140 (B) | |
| 38 -(CH₂)₆- | hexahydro-benzoic acid | -C₆H₁₁ | 143–144 | |
| 39 -(CH₂)₆- | dimethyl fumarate | -CH=CH-COOCH₃ | 123.5–124 (B) | |
| 40 -(CH₂)₆- | diethyl malonate | -CH₂COOCH₃ | 97–98 (B) | |
| 41 -(CH₂)₆- | o-methoxy-benzoic acid | -C₆H₄-OCH₃ | 136–137 (B) | |
| 42 -(CH₂)₆- | diethyl phthalate | -C₆H₄-COOC₂H₅ | 69–70 (B) | |
| 43 -(CH₂)₆- | pivalic acid | -C(CH₃)₃ | 142–143 (B) | |
| 44 -(CH₂)₆- | iso-butyric acid | CH₃-CH-CH₃ | 140–141 (B) | |
| 45 -(CH₂)₆- | methoxyacetic anhydride | -CH₂OCH₃ | 115–117 (B) | |
| 46 -(CH₂)₆- | m-methoxy-benzoic acid | -C₆H₄-OCH₃ | 148–149 (B) | |
| 47 -(CH₂)₆- | isatoic anhydride | -C₆H₄-NH₂ | 152–153 (B) | |
| 48 -(CH₂)₆- | dimethyl tere-phthalate | -C₆H₄-COOCH₃ | 147–148 (B) | |
| 49 -(CH₂)₄- | diethyl malonate | -CH₂COOC₂H₅ | 100–101 (B) | |
| 50 -(CH₂)₂- | diethyl malonate | -CH₂COOC₂H₅ | 143–144 (B) | |
| 51 -(CH₂)₆- | m-toluic acid | -C₆H₄-CH₃ | 119–120 (B) | |
| 52 -(CH₂)₆- | methyl m-nitro-benzoate | -C₆H₄-NO₂ | 1512J 1–151.5 (B) | |

EXAMPLE 53

100 parts of polyester cloth is dyed for 1 hour at 125° C in a dye liquor containing 4,000 parts of water, 1 part of the dye of Example 1 in a finely divided form and 3 parts of 30 percent acetic acid. A bright pink dyeing is obtained having excellent light, wet and thermal fastness properties.

EXAMPLE 54

100 parts of polyester cloth is dyed for 1 hour at 100° C in a dye liquor of 4,000 parts of water which contains 1 part of the finely divided dye according to Example 2 and finely divided o-phenylphenol as a carrier. A bright pink dyeing is obtained having excellent light, wet and thermal fastness properties.

EXAMPLE 55

100 parts of cellulose acetate cloth is treated for 1 hour at 75° C in a dye liquor of 4,000 parts of water which contains 4 parts of Castile coap and 0.8 part of the dye of Example 23 in finely divided form. A bright pink dyeing is obtained having good fastness properties.

EXAMPLE 56

100 parts of cellulose triacetate skein is dyed for 1 hour at boiling temperature in a dye liquor of 2,000 parts of water, 2 parts of the reaction product of oleylamine and 10 moles of ethylene oxide and 1 part of the finely divided dye of Example 1. A full brilliant pink dyeing is obtained having good fastness properties.

EXAMPLE 57

100 parts of polyamide cloth is dyed for 1 hour at 95° C in a dye liquor of 3,000 parts of water, 0.6 part of the finely divided dye of Example 19 and 2 parts of sulfonated sperm oil alcohol. A bright pink dyeing is obtained having good fastness properties.

I claim:

1. A red anthraquinone dye of the formula

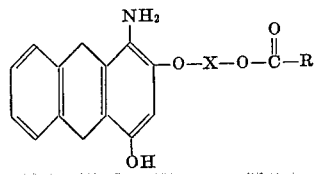

wherein X is hexamethylene and R is a member selected from the group consisting of hydrogen, aliphatic hydrocarbon of one to five carbon atoms which is unsubstituted or which contains one halogen atom or one cyano, keto, carboxylic ester or phenyl group as a substituent, and phenyl which is unsubstituted or which contains one halogen atom or one hydroxyl, methyl, methoxy, nitro, amino or carboxylic ester group as a substituent.
2. A dye as claimed in claim 1 wherein R is phenyl or phenyl substituted by halogen, hydroxyl, methyl, methoxy, nitro, amino or carboxylic methyl or ethyl ester.
3. The dye having the formula:
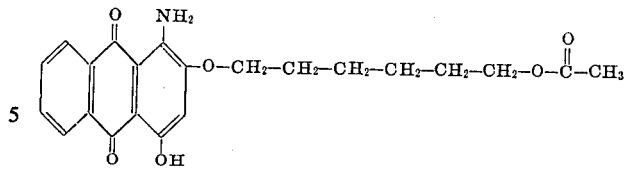
* * * * *

PO-1050
(5/69)

UNITED STATES PATENT OFFICE
CERTIFICATE OF CORRECTION

Patent No. 3,687,985          Dated August 29, 1972

Inventor(s) Karl Maier

It is certified that error appears in the above-identified patent and that said Letters Patent are hereby corrected as shown below:

Column 1, line 56. "-CH-CL" should read -- $-\underset{\underset{CL}{|}}{CH}\ CL$ --

Signed and sealed this 20th day of March 1973.

(SEAL)
Attest:

EDWARD M. FLETCHER, JR.          ROBERT GOTTSCHALK
Attesting Officer                  Commissioner of Patents